United States Patent [19]
Thierman

[11] 3,927,687
[45] Dec. 23, 1975

[54] COMBINATION SHAFT AND SPOOL STRUCTURE

[76] Inventor: I. Bruce Thierman, 8817 N. Swenson St., Portland, Oreg. 97203

[22] Filed: Apr. 18, 1974

[21] Appl. No.: 461,853

[52] U.S. Cl. ............ 132/92 A; 242/100.1; 242/125
[51] Int. Cl.² ................. A61C 15/00; B65H 75/28
[58] Field of Search ............ 242/125, 125.2, 100.1, 242/137.1, 96, 46.21; 206/397, 409, 438, 63.5; 24/71.2; 132/92 R, 92 A; 46/70

[56] References Cited
UNITED STATES PATENTS
1,386,918  8/1921  Westrup et al. ............... 242/100.1
3,734,107  5/1973  Thierman ....................... 132/92 A Primary Examiner—Leonard D. Christian
Attorney, Agent, or Firm—Eugene M. Eckelman

[57] ABSTRACT

A spool has a central opening for receiving a drive shaft end therein. The drive shaft has spline-like projections which engage respective recesses in the spool to provide a drive connection. The free end of the drive shaft has a slot the bottom of which terminates at an upper end thereof at two wedge-shaped projections. The spool has a diametral full width slot leading upwardly from its bottom end into which a line to be attached thereto is threaded. The difference in distance between the upper end of the slot in the spool and the upper end of the two wedge-shaped projections at the shaft slot is less than the thickness of a line to be held on the spool when the latter is installed on the shaft, thus providing a grip on a line which has previously been laid in the shaft slot and providing a starting connection for the line on the spool.

8 Claims, 6 Drawing Figures

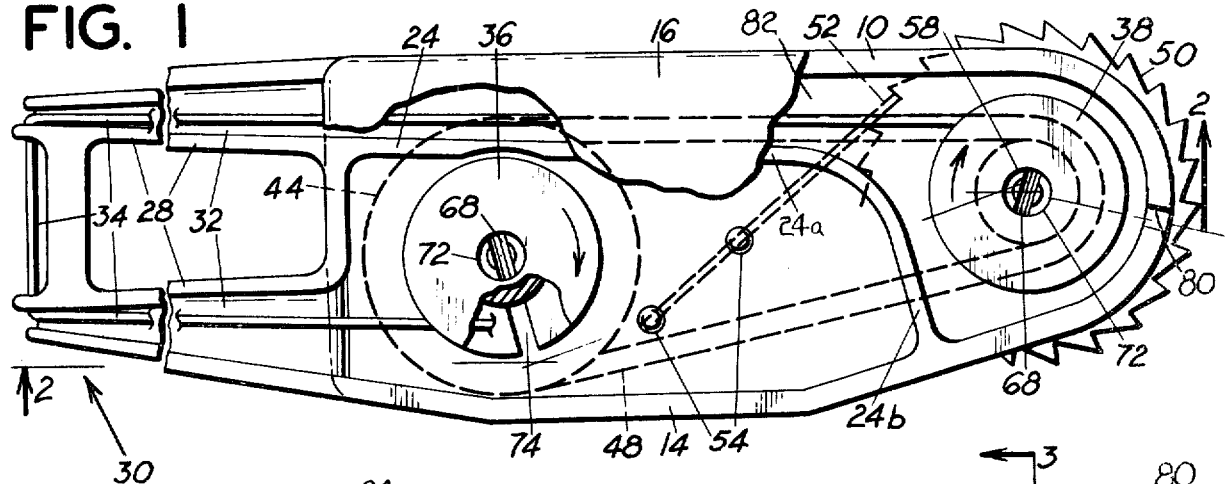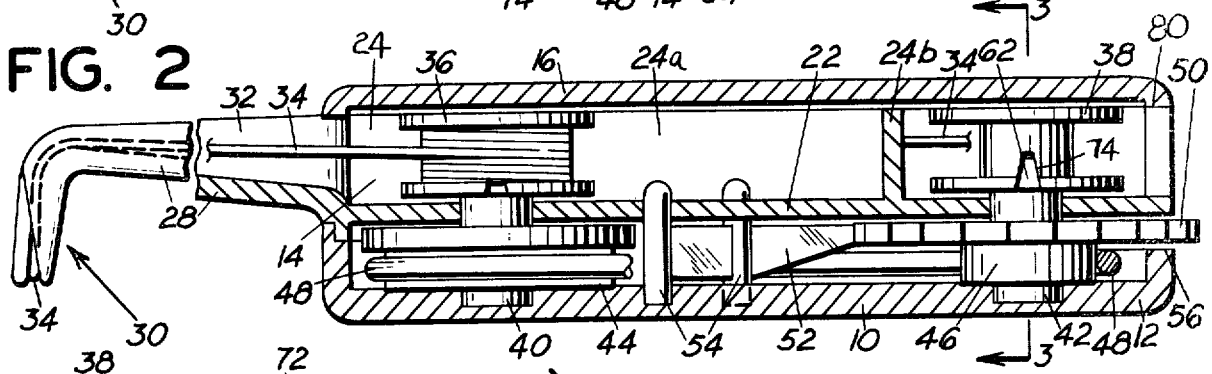

3,927,687

COMBINATION SHAFT AND SPOOL STRUCTURE

BACKGROUND OF THE INVENTION

This invention relates to new and useful improvements in a combination shaft and spool structure.

SUMMARY OF THE INVENTION

According to the present invention and forming a primary objective thereof, a combination shaft and spool structure is provided employing means wherein an end of a line is arranged to be anchored to the spool merely by placing the line on the shaft and then seating the spool on the shaft and rotating it to start the line around the spool.

A more particular object of the present invention is to provide a combination shaft and spool structure wherein there is employed a drive shaft having a top opening diametral slot and a spool having a full width diametral bottom opening slot, the shaft having projections extending laterally in the plane of the bottom end of the shaft slot and the difference in distance between the projections and the top of the slot in the spool when the spool is installed on the shaft being less than the diameter of a line to be held on the spool so that line laid in the shaft slot will be pinched between said wedge-shaped projections and the top of the spool slot, whereby the line is started on the spool by rotating the latter.

Still another object of the invention is to provide a combination shaft and spool structure which is particularly useful in a holder wherein a pair of such combination shafts and spools is used, one of the spools comprising a supply spool and the other spool comprising a take-up spool and wherein a drive connection is provided between the two spools. A useful application of the present invention is in a dental floss tooth cleaning tool wherein dental floss leads from a supply spool to a take-up spool after first passing over support arms, and it is a further object to provide means in such spool to assist in laying line in position for attachment to the spool.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a foreshortened top plan view partly broken away of a dental floss tooth cleaning tool with which the present combination shaft and spool structure may be employed;

FIG. 2 is a foreshortened sectional view of the dental floss tooth cleaning tool, taken on the line 2—2 of FIG. 1;

FIG. 3 is an enlarged fragmentary exploded section view taken on the line 3—3 of FIG. 2 and showing the spool off the shaft;

FIG. 4 is a view similar to FIG. 3 but showing the spool mounted on the shaft;

FIG. 5 is a fragmentary sectional view taken on the line 5—5 of FIG. 3; and

FIG. 6 is a sectional view taken on the line 6—6 of FIG. 4.

DETAILED DESCRIPTION OF A PREFERRED EMBODIMENT

As stated hereinbefore, the present combination shaft and spool structure may have particular application with a dental floss tooth cleaning tool. Such a tool is shown in my U.S. Pat. No. 3,734,107 for Dental Floss Tooth Cleaning Tool. It is to be understood, however, that the present structure may be used for other purposes and with other types of holders wherein it is desired that one end of a line or floss be readily attachable to a spool so that the line can be changed with facility. With reference to FIGS. 1 and 2, the flossing tool comprises a hollow body member 10 adapted to be gripped by one hand. The body member has a bottom wall 12, a peripheral wall 14 which extends around the sides and ends of the body, and a cover 16 connected to the body member by suitable hinges and a snap action latch. Body member 10 has a horizontal dividing wall 22 providing upper and lower chambers. The upper chamber has a vertical partition 24 with a longitudinal portion 24a and a lateral portion 24b.

Projecting integrally from the forward end of body member 10 in substantially parallel relation is a pair of arms 28 terminating in an outer head portion 30. The arms 28 have a top longitudinal groove 32 into which dental floss 34 is arranged to be disposed for supply to the head 30.

The invention resides in the structure of spools 36 and 38 for the floss and the connecting shaft for the spools. Such structure will now be described.

The spools 36 and 38 are arranged for removable attachment to shafts 40 and 42, respectively, which have rotatable support between walls 12 and 22, these shafts being disposed on opposite sides of wall 24. The shafts 40 and 42 have pulley or drum portions 44 and 46, respectively, engaged by an O-ring belt 48 establishing a drive connection between the two spools. Spool 38 has one-way rotation by means of a ratchet wheel 50 secured on the shaft 42 and engageable by a pawl 52 forming an integral part of a pair of posts 54 secured between walls 22 and 12 of the body member 10. The pawl is made of a plastic or semi-flexible material, and while having sufficient rigidity to engage the back side of the teeth of the ratchet wheel and hold it against reversing, such pawl is sufficiently flexible to ride over the teeth and pick up the next tooth as the ratchet wheel is rotated to supply new floss to the head 30. The rearward end of the housing has a horizontal slot 56 and the ratchet wheel 50 projects a short distance outwardly of the slot so as to be engageable by the operator for rotation.

Reference is now made to FIGS. 3–6 showing structural details of the shafts and spools. The two spools and their shaft connection are identical, and the structure associated with only one spool, namely, spool 38, will be described.

Drive shaft 42 for spool 38 projects above the wall 22 and has a reduced diameter upper portion 58 having a tapered upper end 60. A pair of wedge-shaped projects 62, tapered to a smaller dimension toward the top to provide a non-locking angle, FIG 5, are provided diametrically on opposite sides of the shaft 58 and extend only partway up the shaft, terminating in a top flat end 64. A diametral slot 68 extends down into the shaft 58 from the top thereof and terminates at its bottom in the plane of the top 64 of projections 62. As best seen in FIG. 5, the slot 68 is tapered, with the wide portion thereof being at the top which, as will be seen, facilitates the laying of dental floss therein. Shaft 42 has spline-like projections 70 extending almost to the top thereof, the projections being located at 90 degrees around the shaft from wedge-shaped projections 62.

Spool 38 has a central opening 72 of a diameter adapted to receive the upper end 58 of shaft 42. Such spool also has a slot 74 extending upwardly from the lower end thereof, such slot extending the full width of the spool and terminating at its upper end in a wall 76 at a selected distance from the bottom of the spool as will be described in greater detail hereinafter. The slot 74 is tapered to a narrowed dimension toward the upper end thereof, FIG. 2, and receives the tapered projections 62 on the shaft. The spool has recesses 78 leading upwardly from the bottom end thereof and disposed 90 degrees around from the slot 74 for receiving the projections 70.

The back portion of wall 14 has a slot 80 leading down from the top which is disposed substantially in alignment with the center of the shaft 58 and the passageway 82 between wall 24 and adjacent wall portion 14.

With particular reference to FIG. 4, the vertical height of slot 74 in the body of the spool is such that when the spool is pressed down on the shaft 58 for installation thereon, the spacing between the top wall 76 of the slot 74 and the top wall 64 of the projections 62 is less than the thickness of the line to be held on the spool. Thus, a line is adapted to be anchored between the spool and the shaft by the pinching engagement thereof from laterally overlapping portions of walls 76 and 64 whereby it is held firmly for starting it on the spool.

To describe the process of anchoring an end of the line on spool 38, the shaft is first rotated to a selected position such that the slot 68 therein is aligned longitudinally with wall 24 on the side facing and forming part of passage 82 and with slot 80 therebehind. With the slot 68 in such longitudinally disposed position, the free end of the floss, after having been passed over the head 30, is laid in the passage 82 and slot 68 and also in slot 80. With the floss disposed in the slot 68, the spool is placed on the shaft with the slot 74 therein aligned with the floss and consequently aligned with the projections 62. The spool is pressed down, and in its lowermost position, the walls 76 and 64 pinch the floss therebetween. The spool 38 need then only be rotated a slight amount to start the floss winding on the drum portion thereof. Rotation of the spool may be accomplished by finger operation of the ratchet wheel 50. The wedge-shaped projections on the shaft serve three important functions: (1) to support the diametrically grooved portion of the spool to prevent that portion from collapsing onto the shaft during the process of winding floss under considerable tension onto the drum; (2) the non-locking angle of the projection on the shaft and groove in the spool makes it possible to remove the spool when it is filled; and (3) a grip is obtained on the floss between its flat upper surface and the mating flat surface in the spool diametral groove.

As stated above, the structure of the two spools and the connection with the shaft are identical whereby when the supply spool 36 is depleted, it can be moved over to serve as a take-up spool when a full new spool is installed.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the present spool may be used for any spool shaft connection where it is desired that the spool have removable connection on the shaft for replacement.

Having thus described my invention, I claim:

1. A combination shaft and spool structure comprising:
   a. a shaft having a free end,
   b. means defining a diametral slot in said free end of the shaft,
   c. a spool having an outer surface drum portion for winding line thereon,
   d. an axial bore in said spool arranged to receive said shaft from one end of said spool,
   e. spline-like means on said shaft and spool establishing a locked drive connection therebetween,
   f. and means defining a diametral slot in said spool leading from the said one end part way through the spool toward the other end in intersecting relation with said bore and terminating in an end wall in the plane of the outer surface drum portion whereby a line can be attached to the drum and wound on said drum portion by disposing it in the diametral slot in the shaft prior to installing the spool on the shaft and then rotating the shaft after installing the spool thereon.

2. A combination shaft and spool structure comprising:
   a. a shaft having a free end,
   b. means defining a diametral slot in said free end of the shaft,
   c. a spool having an outer surface drum portion for winding line thereon,
   d. an axial bore in said spool arranged to receive said shaft from one end of said spool,
   e. spline-like means on said shaft and spool for establishing a drive connection therebetween,
   f. means defining a diametral slot in said spool leading from the said one end part way through the spool toward the other end in intersecting relation with said bore and terminating in an end wall in the plane of the outer surface drum portion whereby a line can be attached to the drum and wound on said drum portion by disposing it in the diametral slot in the shaft prior to installing the spool on the shaft and then rotating the shaft after installing the spool thereon,
   g. and a projection on said shaft located with relation to the end wall of the spool shaft such that when said spool is installed on said shaft, line which is disposed in said slot is pinched between said end wall of the slot and said projection to provide an anchor point for winding on the drum.

3. The combination shaft and spool structure of claim 2 wherein said diametral slot in said shaft leads inwardly from said free end and terminates at said projection.

4. The combination shaft and spool structure of claim 3 wherein said projection comprises support means on said shaft to support that portion of said spool diametrally grooved from collapsing onto said shaft when the spool is tightly wound with line.

5. The combination shaft and spool structure of claim 3 including a pair of splines on opposite sides of said shaft spaced around from said projection and engageable in spline recesses in said spool.

6. The combination shaft and spool structure of claim 4 wherein said support means is tapered and the spool slot is also tapered in that portion which receives the support means, said support means and tapered portion of said spool slot being dimensioned to have a non-locking wedging fit, permitting easy removal of filled spool from said shaft.

7. The combination shaft and spool structure of claim 3 in combination with a holder in which said shaft is rotatably supported, wall means in said holder defining a passageway through which line leads to the spool, said wall means comprising an outer wall portion and an inner wall portion, a length of said inner wall portion being substantially aligned with said shaft with relation to a run of the line for guiding the line into said shaft slot in the process of attaching the line to the spool.

8. The combination shaft and spool structure of claim 3 in combination with a holder in which said shaft is rotatably supported, wall means in said holder defining a passageway through which line leads to the spool, said wall means comprising an outer wall portion and an inner wall portion, a length of said inner wall portion being substantially aligned with said shaft with relation to a run of the line for guiding the line into said shaft slot in the process of attaching the line to the spool, and means defining a slot in said outer wall portion on the opposite side of said spool from said passageway into which the line is received when feeding it into said shaft slot.

* * * * *